United States Patent Office 3,163,656
Patented Dec. 29, 1964

3,163,656
FLUOROSULTONES AND SULFITES, AND THE PREPARATION OF THE LATTER
John Lynde Anderson, Northwood, and David C. England, Holly Oak, Del., assignors to E. I. du Pont de Nemours and Company, Wilmington, Del., a corporation of Delaware
No Drawing. Filed Dec. 9, 1955, Ser. No. 552,224
5 Claims. (Cl. 260—327)

This invention relates to a new class of fluoro-substituted heterocycles, and more particularly it relates to a new class of polyfluorosubstituted oxathiaheterocycles and to methods for their preparation.

The reaction of polyhalogenated ethylenes with sulfuric acid has taken various courses. Thus tetrachloroethylene reacts with sulfur trioxide to give open chain compounds whereas ethylene, symmetrical dichloroethylene, and trichloroethylene give dioxadithia six-membered heterocycles. See U.S. 2,695,308 and U.S. 1,913,794. See also Suter et al., J. Am. Chem. Soc. 67, 827 (1945). Tetrafluoroethylene has been shown (U.S. 2,403,207) to react with sulfurous acid salts to form acyclic compounds.

This invention has as an object the preparation of new insect repellents. A further object is the preparation of new repellents for the black carpet beetle. Further objects will appear hereinafter.

These objects are accomplished by the present invention of polyfluorooxathia heterocyclic compounds. These heterocyclic compounds have four to five ring atoms of which two are carbon, one is sulfur, and the remaining ring atoms are oxygen atoms. The compounds have a plurality of fluorine atoms, two at least of which are attached to ring carbon. The compounds have, at most, one hydrogen attached to ring carbon. The compounds have one sulfur atom and that a ring atom and three oxygen atoms, at least one of which is a ring atom and at least one of which is extranuclear but attached to ring sulfur.

The compounds have a continuous chain of a plurality of saturated, i.e., only singly bonded carbon atoms, two of which form, with a bivalent—SO₃—radical, an oxathiaheterocycle of from four to five annular members, which carbon chain has, as its only substituents other than said —SO₃— radical, a plurality of only singly bonded halogen atoms, preferably of atomic number no greater than 35, said plurality of halogen atoms including a plurality of fluorine atoms, two at least of which fluorine atoms are on ring carbons of the oxathiaheterocycle, there being at most one hydrogen on said oxathiaheterocycle.

These new polyfluorosubstituted sulfur and oxygen-containing heterocyclic compounds have the structural formula:

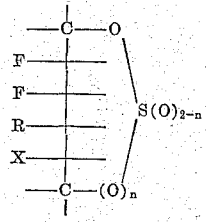

wherein n is a cardinal number no greater than 1, i.e., 0 or 1; X is halogen, preferably of atomic number no greater than 35, and R is of not more than ten carbons and is selected from the class consisting of X, hydrogen, saturated hydrocarbon, and saturated halogenohydrocarbon wherein the halogen is X. Thus R can be X, hydrogen, saturated hydrocarbon (straight chain, branched chain, closed chain), or halogenated hydrocarbon (straight, branched, or closed chain) wherein the halogen is X.

These new polyfluorosubstituted oxathiaheterocycles are thus polyfluorosubstituted sultones and sulfites having two ring carbon members and generically are 2,2- dioxo-1,2-oxathietanes and 2-oxo-1,3,2-dioxathiolanes in which the four external valences of the two ring carbons, i.e., those not tied up in ring formation, are satisfied by single and direct linkage to at least two fluorine atoms, to at least one halogen preferably of atomic number no greater than 35, or to at most one hydrogen or straight, branched, or closed chain hydrocarbon, hydroperhalocarbon or perhalocarbon radical where the halo substituents, if any, are as above. While the hydrocarbon and halogenohydrocarbon radicals are not limited in size, the most readily available compounds are those wherein any such radical is of no more than 10 carbons, including both aliphatic and cycloaliphatic radicals.

Because of wider chemical versatility, the preferred products of this invention are the above-described polyfluorosubstituted 4-membered, oxygen and sulfur-containing heterocycles, i.e., the 2,2-dioxo-1,2-oxathietanes, wherein the four valences of the two ring carbons not involved in ring forming linkages are satisfied by direct and single linkages to at least two fluorine atoms, to at least one halogen atom preferably of atomic number no greater than 35, and to at most one hydrogen or straight or branched chain saturated monovalent aliphatic hydrocarbon, hydroperhalohydrocarbon, or perhalohydrocarbon radical where the halo substituents, if any, are as just defined and the number of carbons in said radical does generally not exceed ten and preferably eight.

The new polyfluorosubstituted sulfur and oxygen-containing heterocycles of the present invention can be prepared simply and directly by the addition of sulfur trioxide to polyfluorosubstituted olefins in which the two carbons of the olefinic or ethylenic linkage carry directly and singly connected thereto at least two fluorine atoms, at least one halogen preferably of atomic number no greater than 35 and at most either a hydrogen atom or a straight, branched, or closed chain hydrocarbon or halogenohydrocarbon saturated radical of no more than ten carbons, the halogen being of atomic number no greater than 35. The polyfluoroolefin reactants have the structural formula:

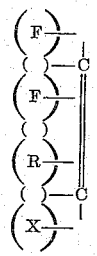

wherein X is halogen preferably of atomic number no greater than 35, and R is of not more than ten carbons and is selected from the class consisting of X, hydrogen, saturated hydrocarbon, and saturated halogenohydrocarbon wherein the halogen is X. Thus, R can be X, hydrogen, saturated hydrocarbon (straight chain, branched chain, closed chain), or halogenated hydrocarbon (straight, branched, or closed chain) wherein the halogen is X.

In the above formula the four indicated valences of the two carbon atoms, i.e., here the olefinic or ethylenic carbon atoms, not involved in the indicated carbon to carbon linkages are satisfied by one each of the four groups present in the brackets. As is apparent from the foregoing, the two carbons of the olefinic linkage in the polyfluorosubstituted olefin intermediate thus constitute the two ring carbons of the new polyfluorosubstituted oxygen and sulfur-containing 4-and 5-ring membered heterocycles of the present invention. Similarly, the substituents on these two olefinic carbons in the polyfluorosubstituted olefin intermediates constitute the substituents on the two ring carbons of the new heterocycles of this invention.

The following examples in which parts are by weight are illustrative of the invention.

Example I

A pressure reactor fabricated from borosilicate glass and fitted with a gas entry tube, a thermocouple well, and means for shaking was charged with 212 parts of freshly distilled, anhydrous, liquid sulfur trioxide (which had been condensed at room temperature to prevent any polymerization) and the reactor was then pressured, while shaken, to 40 lbs./sq. in. gauge with gaseous tetrafluoroethylene. An exothermic reaction set in at once. The reactor was packed with ice and thereby cooled to bring the internal temperature below 80° C. Gaseous tetrafluoroethylene was repressured as needed to maintain the internal pressure at 40 lbs./sq. in. guage over a period of about one hour, after which no further absorption of tetrafluoroethylene was obtained. A total of about 265 parts of tetrafluoroethylene was absorbed. The reactor was then bled to the atmosphere, allowed to warm to room temperature, and the reaction mixture removed and fractionated. There was thus obtained 442 parts (92.8% of theory) of 2-hydroxytetrafluoroethanesulfonic acid sultone (3,3,4,4-tetrafluoro-2,2-dioxo-1,2-oxathietane) as a clear, colorless liquid boiling at 42° C. under atmospheric pressure. Nuclear magnetic resonance spectra indicated the presence of no other compound.

Another identical preparation resulted in substantially the same results. The product on analysis exhibited a neutral equivalent of 44.9 and 45.2 (theory for pure 2-hydroxytetrafluoroethanesulfonic acid sultone being 45.0).

Another similar preparation using 16 parts of unredistilled stabilized liquid sulfur trioxide (known commercially as "Sulfan B") resulted in the isolation of 19.3 parts (53.5% of theory) of 2-hydroxytetrafluoroethanesulfonic acid sultone as a clear, colorless liquid boiling at 42° C. and exhibiting a characteristic nuclear magnetic resonance spectrum for the sultone.

*Analysis.*—Calculated for $C_2F_4O_3S$: S, 17.8%; F, 42.2%; N.E., 45.0. Found: S, 18.1%, 18.1; F, 41.6%, 40.7; N.E., 45.5.

Another similar experiment using 19 parts of the commerical, stabilized sulfur trioxide resulted in the isolation of 12 parts (28% of theory) of a clear colorless liquid mixture, boiling at about 42° C. at atmospheric presssure, and exhibiting a nuclear magnetic resonance spectrum showing the presence of both the 2-hydroxytetrafluoroethanesulfonic acid sultone and the isomeric cyclic sulfite of 1,2-tetrafluoroethylene glycol, 4,4,5,5-tetrafluoro-2-oxo-1,3,2-dioxathiolane.

*Analysis.*—Calculated for $C_2F_4O_3S$: N.E. for the sultone 45.0; N.E. for the sulfite 22.5. Found: 38.2; 38.3.

Both nuclear magnetic resonance and the neutral equivalent indicated the product to contain about 80% of the sultone and about 20% of the isomeric sulfite. This sample of commercial sulfur trioxide contained sufficient water to cause formation of this mixture. Addition of a small amount of water to dstilled sulfur trioxide caused a similar result. The sultone-sulfite mixture was separated, by fractional distillation through a highly efficient precision column, into the sultone boiling at 42° C. and the sulfite a clear colorless liquid boiling at 45° C. ±1° C. and exhibiting a characteristic nuclear magnetic resonance spectrum for the sulfite. On reaction with cyclohexylamine and with aniline the sulfite gave N,N'-dicyclohexyloxamide and oxanilide, respectively.

Example II

Gaseous tetrafluoroethylene was metered at a rate of about one mole per hour into the top of a vertically mounted cyclindrical reactor 20 diameters long packed with short glass cylinders of diameter of about ⅓ of that of the reactor, while freshly distilled, anhydrous, liquid sulfur trioxide was admitted to the top of the reactor at a rate of about one mole per hour, i.e., in about equimolar proportions. An exothermic reaction occurred near the bottom of the packing, warming that zone of the reactor to about 45° C. No heat was supplied to the reactor. The reactants were added at this rate while maintaining these conditions for a period of about 40 minutes, during which the off gases from the bottom of the reactor were collected in a trap cooled in a solid carbon dioxide/acetone bath. At the end of this period, the trap was removed from the cooling bath and allowed to warm to room temperature. There was thus obtained 59 parts of liquid product and considerable solid sulfur trioxide polymer. Upon distillation there was obtained 53 parts (about 43.6% conversion based on $SO_3$) of 2-hydroxy-tetrafluoroethanesulfonic acid sultone as a clear colorless liquid boiling at about 42° C. under atmospheric pressure and exhibiting the characteristic nuclear magnetic resonance spectrum therefor.

Another similar preparation using 99 parts of the commercially available, stabilized sulfur trioxide, presumably containing more water, resulted in the formation of 95 parts of a mixture of the sultone and sulfite as a clear colorless liquid boiling over the range 36–46° C. and mostly at 37–38° C. at atmospheric pressure. The liquid mixture of the 2-hydroxytetrafluoroethanesulfonic acid sultone and the cyclic tetrafluoroethyleneglycol sulfite was indicated to be largely the former as evidenced by nuclear magnetic resonance spectra. Furthermore, neutral equivalent determination corresponded to an about 80–20 sultone/sulfite mixture.

*Analysis.*—Calculated for $C_2F_4O_3S$: N.E. for the sultone 45.0; N.E. for the sulfite 22.5. Found: 38.8; 39.1.

Another similar preparation using 99 parts of the commercially available, stabilized, sulfur trioxide and varying in that the vertical cylindrical reactor was heated throughout its length by a furnace maintained at 400° C. (internal reactor temperature 378° C.) resulted in the formation of 75 parts of a 54.4/45.6 mixture of the isomeric 2-hydroxy-tetrafluoroethanesulfonic acid sultone and the cyclic tetrafluoroethylene glycol sulfite as a clear liquid boiling at 37–46° C. Nuclear magnetic resonance spectra showed less sultone than in the preceding products. Neutral equivalent determinations of 34.7 and 34.8 confirmed the 54.4/45.6 ratio. On standing the relative proportions of the isomers in the mixture changed. Thus, after standing several weeks redistillation of the mixture resulted in the isolation of a liquid product boiling at 38–46° C. under atmospheric pressure which by nuclear magnetic resonance was indicated to have at least 75% of the cyclic sulfite.

Example III

A pressure reactor as in Example I was charged with 46.5 parts of freshly distilled liquid sulfur trioxide and then pressured to 40 lbs./sq. in. (gauge) with gaseous chlorotrifluoroethylene with ice cooling and shaking. Absorption of the chlorotrifluoroethylene was rapid and exothermic; repressuring with chlorotrifluoroethylene to 40 lbs./sq.in. (gauge) was carried out intermittently as needed until absorption was complete. This required about one hour and a total of 100 parts (148% of theory) was absorbed. The reactor was then vented to the atmosphere, allowed to warm to room temperature, and the liquid reaction mixture removed. Upon distillation there was obtained 97 parts (85% of theory based on the sulfur trioxide) of an about 50/50 mixture of 2-hydroxy-2-chloro-1,1,2-trifluoroethanesulfonic acid sultone (4-chloro - 3,3,4 - trifluoro - 2,2 - dioxo - 1,2 - oxathietane)

and 2 - hydroxy - 1 - chloro - 1,2,2 - trifluoroethanesulfonic acid sultone (3-chloro-3,4,4-trifluoro-2,2-dioxo-1,2-oxathietane) as a clear, colorless liquid boiling at 75–77° C.

*Analysis.*—Calculated for $C_2ClF_3O_3S$: N. E., 49.1. Found: N. E., 49.1; 49.3.

Nuclear magnetic resonance spectra were utilized to determine the presence of the two position isomers of the 2-hydroxy-chlorotrifluoroethanesulfonic acid sultone in about equal amounts.

Example IV

A pressure reactor as in Example I was charged with 47.8 parts of freshly distilled liquid, monomeric sulfur trioxide and then pressured to 40 lbs./sq.in. (gauge) with gaseous trifluoroethylene. Absorption was rapid and exothermic. The reactor was cooled with wet ice and shaken, and repressured intermittently as needed with shaking to 40 lbs./sq.in. (gauge) with 41 parts of gaseous trifluoroethylene (92% based on $SO_3$) over a period of about one hour. The reactor was then vented to the atmosphere and allowed to warm to room temperature. Upon distillation there was obtained 49.5 parts (60% of theory based on the trifluoroethylene) of 2-hydroxytrifluoroethane-sulfonic acid sultone (3,4,4-trifluoro-2,2-dioxo-1,2-oxathietane) as a clear, colorless liquid boiling at 100–110° C., and mostly at 103° C., at atmospheric pressure.

*Analysis.*—Calculated for $C_2HF_3O_3S$: S, 19.8%; F, 35.2%; N.E., 40.5. Found: S, 19.9%; F, 35.0%; N.E., 40.9; 41.1.

Example V

To 85 parts of 1,1-dichloro-2,2-difluoroethylene in a reactor fitted with a reflux condenser and protected from the atmosphere through drying tubes was added 51 parts (an equimolar proportion based on the dichlorodifluoroethylene) of freshly distilled liquid sulfur trioxide dropwise with stirring over a period of about 15 minutes, while cooling the reactor in an ice/water bath. When the addition of the sulfur trioxide had been completed, the cooling bath is removed and the reaction mixture was allowed to warm to room temperature with stirring. Finally, the reaction mixture was heated to reflux with stirring and maintained at this temperature for about 30 minutes. At the end of the reflux period, the reaction mixture was fractionated. There was thus obtained 27 parts (19.8% of theory) of a clear colorless liquid boiling at 102–105° C. at atmospheric pressure.

Analysis.—Calculated for $C_2Cl_2F_2O_3S$: Cl, 33.3%; F, 17.8%; S, 15.0%; N.E., 53.8. Found: Cl, 32.7%; F, 18.0%; S, 16.0%; N.E., 53.3; 53.2.

Nuclear magnetic reosonance spectra indicate that the product is 2-hydroxy-1,1-dichloro-2,2 - difluoroethanesulfonic acid sultone (3,3-dichloro-4,4-difluoro-2,2-dioxo-1,2-oxathietane).

Example VI

To 55 parts of 1,2-dichloro-1,2-difluoroethylene in a reactor cooled with an ice/water bath and fitted with an ice cooled reflux condenser was added dropwise with stirring over a period of ten minutes 33 parts (about equimolar proportion based on the haloethylene) of freshly distilled, liquid, anhydrous sulfur trioxide. The reaction mixture was then allowed to warm to room temperature, stirred at this temperature for an additional hour, and finally distilled through a precision fractionating column. There was thus recovered 4 parts (about 7.3% recovery) of 1,2-dichloro-1,2-difluoroethylene. On continued distillation there was obtained 65.7 parts (76% conversion and 80% yield) of 2-hydroxy-1,2-dichloro - 1,2 - difluoroethanesulfonic acid sultone (3,4-dichloro-2,4-difluoro - 2,2 - dioxo - 1,2 - oxathietane) as a clear, colorless liquid boiling at 105–113° C. (mostly at 109–113° C. at atmospheric pressure).

*Analysis.*—Calculated for $C_2Cl_2F_2O_3S$; N.E., 53.25. Found: N.E., 53.2.

As further characterization the product exhibited a nuclear magnetic reasonance spectrum consistent with the four-membered sultone.

Example VII

To 27.6 parts of 1,1,2-trifluorohexene-1 in a reactor cooled with an ice/water bath and fitted with an ice-cooled reflux condenser was added dropwise with stirring over a period of a few minutes 20 parts (1.25 molar proportions based on the haloethylene) of freshly distilled, liquid anhydrous sulfur trioxide. The reaction mixture was then allowed to warm to room temperature and then distilled through a precision fractionating column. There was thus obtained 31.4 parts (72% yield) of 1-n-butyl-2-hydroxy-1,2,2 - trifluoroethanesulfonic acid sultone (3-n-butyl-3,4,4-trifluoro-2,2 - dioxo-1,2-oxathietane) as a clear, colorless liquid boiling at 63–65° C. under a pressure corresponding to 20 mm. of mercury.

*Analysis.*—Calculated for $C_6H_9F_3O_3S$: F, 26.1%; S, 14.7%. Found: F, 26.6%; S, 15.0%.

Example VIII

A mixture of 25 parts of 8-hydroperfluorooctene-1 and 5.7 parts (about 1.1 molar proportions based on the haloethylene) of freshly distilled, liquid anhydrous sulfur trioxide was heated in a sealed glass reactor overnight at steam bath temperature. The reactor was cooled, opened, and the liquid mixture distilled through a precision fractionating column. There was thus obtained 27.4 parts (90% yield) of 2-hydroxy-1(omega-hydroperfluorohexyl)-1,2,2 - trifluoroethanesulfonic acid sultone [3-(omega-hydroperfluorohexyl)-3,4,4 - trifluoro-2,2-dioxo-1,2-oxathietane] as a clear, colorless liquid boiling at 115–116° C. under a pressure corresponding to 130 mm. of mercury. The composition of the product did not change after another treatment under identical conditions with a further excess of sulfur trioxide. Upon redistillation the product was obtained unchanged as a clear, colorless liquid boiling at 75–76° C. under a pressure corresponding to 22 mm. of mercury.

*Analysis.*—Calculated for $C_8HF_{15}O_3S$: F, 61.8%; S, 6.9%; N.E.=115. Found: F, 63.7%; S, 7.1%; N.E.=115.5.

The nuclear magnetic resonance spectrum of the product was consistent with the 4-membered sultone.

Example IX

A mixture of 150 parts of hexafluoropropene and 60 parts (0.75 molar proportion based on the propene) of freshly distilled, liquid, anhydrous sulfur trioxide was heated at 60° C. for eight hours at autogenous pressure in a closed, stainless steel-lined, pressure vessel. The reaction mixture was allowed to cool to room temperature, vented to the atmosphere and distilled through a precision fractionating column. There was thus obtained 73.7 parts (42.7% of theory) of 2-hydroxy-1-trifluoromethyl-1,2,2-trifluoroethanesulfonic acid sultone (3-trifluoromethyl-3,4,4-trifluoro-2,2-dioxo-1,2-oxathietane) as a clear, colorless liquid boiling at 46.5° C. at atmospheric pressure.

*Analysis.*—Calculated for $C_3F_6O_3S$: C, 15.7%; H, 0.0%; S, 13.9%; F, 49.5%. Found: C, 15.6% H, 0.5%; S, 14.0%; F, 48.7%.

As further characterization the liquid product exhibited a nuclear magnetic resonance spectrum consistent with the four-membered sultone structure.

The new polyfluorosubstituted oxygen and sulfur-containing four- and five-ring membered heterocycles of the present invention are readily prepared by reacting sulfur trioxide directly with the requisite polyfluorosubstituted olefin. The desired polyfluorosubstituted heterocyclic compounds are obtained directly from the reaction mixture in high yield and good conversion and high purity by simple conventional fractional distillation of the reaction mixture. The separation of the sultone from the isomeric sulfite requires a highly efficient precision still.

In general, no catalyst is necessary, nor is any reaction medium required, although any inert normally liquid organic solvent can be used where desired. Suitable examples of such useful solvents include nitrobenzene, the open chain ethers, e.g., diethyl or dibutyl ether; the cyclic ethers, e.g., dioxane; the highly halogenated hydrocarbons, such as carbon tetrachloride; the lower N,N-disubstituted aliphatic acid amides, such as dimethylformamide, dimethylacetamide; the hydrocarbons, both aromatic and aliphatic, such as hexane, and the like. Because of greater convenience it is preferred to use no reaction medium.

The sulfur trioxide employed is preferably relatively pure and free of the solid polymeric form. For best results, particularly for obtaining the oxathietanes, the sulfur trioxide is freshly distilled before use, preferably being condensed at temperatures no lower than room temperature to further prevent any contamination with the solid and relatively nonreactive form. However, as is obvious from the examples, the sulfur trioxide used need not be absolutely pure. The generally available commercial liquid forms containing added stabilizer to retain the liquid condition are adequate, although yields are low, especially on large scale operations. The sulfur trioxide can be used in substantially equimolar proportions based on the polyfluorosubstituted olefins, or in lower or higher proportions. For ideal conditions resulting in maximum conversion and yields to the desired 4- and 5-ring membered heterocycles, the sulfur trioxide is present in at least an equimolar proportion based on the polyfluorosubstituted olefin and generally in no greater excess than about 10%. Where convenient it is desirable to add the sulfur troxide to the olefin.

The relative percentage of adsorbed water or relative degree of hydration influences greatly the mode of addition of the sulfur trioxide to the polyfluoroolefin. Thus, when freshly distilled, anhydrous sulfur trioxide is used, the one to one addition product appears to be almost exclusively the 4-ring membered sultone, i.e., the dioxooxathietane. On the other hand, when either the commercial form of the stabilized liquid sulfur trioxide containing varying, but relatively minute, quantities of adsorbed water, i.e., as $H_2(SO_3)_xO$, or freshly distilled, liquid sulfur trioxide to which small quantities of water have been added, is used the one to one addition products are mixtures of the 4- and 5-ring membered products, i.e., the dioxooxathietanes and the oxodioxathiolanes. Generally speaking, in such instances, the 4-ring membered products comprises at least 50% of the one to one addition product. On standing, the relative proportions of the 4- and 5-ring membered compound changes, the percentage of the 5-ring membered compound generally increasing.

The relatively minute absorbed quantities of water not only affect the mode of the addition, but also generally markedly decrease the efficiency of the reaction in terms of the overall conversions. The relative amount of adsorbed water necessary to effect this change in the reaction is not known with any certainty, but is apparently quite low. For instance, freshly distilled, anhydrous, liquid sulfur trioxide (free of both stabilizer and water) to which approximately 0.06% by weight, liquid water has been added, when used in the manner set forth in Example I of the foregoing in reaction with gaseous tetrafluoroetheylene, resulted in the formation of a mixture of the 4-ring membered compound with about 15–20% of the 5-ring membered compound in only about 46% total yield; whereas, without the added water (as given in detail in Example I) this same sulfur trioxide resulted in the formation of only the 4-ring membered compound in a yield greater than 90% of theory.

The reaction conditions can vary widely, depending upon the particular nature of the olefin involved. Thus the temperature employed depends upon the respective polyfluorosubstituted olefin being used and on the particular nature of the reaction equipment involved. Broadly speaking, the reaction temperatures can vary from about 0° C. to a high as 400° C. or 500° C. More specifically, with the lower boiling, normally gaseous polyfluorosubstituted olefins the reaction is carried out at temperatures within the range of about 0° C. to about 100° C. and if a closed reaction vessel is involved, conveniently under superatmospheric pressure, desirably in the order of 25–50 lbs./sq. in. On the other hand, with the higher boiling polyfluorosubstituted olefins the reaction will be carried out in open reaction vessels conveniently at the reflux. It is frequently most convenient to carry out the reaction under continuous operating conditions in which case with both the low boiling and higher boiling polyfluorosubstituted olefins, the reaction temperature can be raised to as high as 400° C. or 500° C.

The reaction appears to take place rapidly. With the lower boiling polyfluorosubstituted olefins reaction is, in many instances, spontaneous and exothermic. Thus, when pressuring tetrafluoroethylene or chlorotrifluoroethylene into sulfur trioxide, the reaction can be run as fast as the heat of reaction can be dissipated to keep down the vapor pressure of the product. Generally speaking, the reaction is over within from a few minutes to a few hours, e.g., from 10 to 30 minutes to two to eight hours. Reaction times will vary with themperature, pressure, the nature and amount of the reactants, and the like. In general, reaction times greater than six to eight hours are not needed.

The desired polyfluorosubstituted 4- and 5-ring membered oxygen and sulfur-containing heterocycles are obtained directly. It is only necessary to remove from the reaction mixture any unreacted sulfur trioxide, and distill in conventional manner to isolate the product or remove any unreacted polyfluoroolefin or reaction medium, if used, in the case of the higher boiling or even solid sultone and/or sulfite products. The desired 4- and 5-ring membered heterocycles are obtained from the residue by simple and conventional means, involving simple precision distillation for the conventional liquid, lower molecular weight, heterocycles. The 4- and 5-ring membered heterocycles, i.e., the sultones and sulfites in most instances can also most simply be separated by similar simple precision distillation in a highly efficient column, e.g., a Podbielniak column. As the molecular weight of the products increases, i.e., with increasing weight of the two variable substituents on the two ring carbons, e.g., with increasing molecular weight of the halogen or the perfluorocarbon radical, if present, the products likewise increase in boiling point and gradually reach the level where they are solids at room temperature. Such compounds can be purified by conventional precipitation, recrystallization, or solvent extraction techniques.

In the process of the present invention there can be reacted with sulfur trioxide an organic compound having but one multiple bond and that a terminal double bond between open chain carbons, having at least two fluorine atoms on doubly bonded carbon, having at most one hydrogen on doubly bonded carbon, having any substituents on the carbon chain of said compound halogen, preferably of atomic number no greater than 35, i.e., a polyfluoroolefin of the formula:

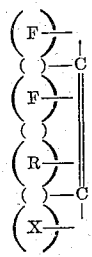

wherein X is a halogen preferably of atomic number not greater than 35 and R is of not more than ten carbons and is selected from the class consisting of X, hydrogen, saturated hydrocarbon, and saturated halogenohydrocarbon wherein the halogen is X, including 2-chloroperfluoropropene-1, perfluoroheptene-1, perfluorooctene-1, bromotrifluoroethylene, 1-chloro-1,2-difluoroethyene; 1-chloro-2,2-difluoroethylene, perfluorodecene-1, perfluorododecene-1, ω-hydroperfluorododecene-1, 1,1,2-trifluorododecene-1, and the like.

The new polyfluorosubstituted 4- and 5-ring membered oxygen and sulfur-containing heterocycles of this invention resulting from interaction between sulfur trioxide and the low molecular weight polyfluoromonoolefins and further illustrative of the general formula:

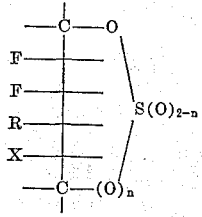

wherein X, R, and $n$ are as before, are:

3-choloro-3,4-difluoro-4-trifluoromethyl-2,2-dioxo-1,2-oxathietane,
4-chloro-3,4-difluoro-3-trifluoromethyl-2,2-dioxo-1,2-oxathietane,
4-chloro-4,5-difluoro-5-trifluoromethyl-2-oxo-1,3,2-dioxathiolane,
3-perfluoropentyl-3,4,4-trifluoro-2,2-dioxo-1,2-oxathietane,
4-perfluoropentyl-4,5,5-trifluoro-2-oxo-1,3,2-dioxathiolane,
3-perfluorohexyl-3,4,4-trifluoro-2,2-dioxo-1,2-oxathietane,
4-perfluorohexyl-4,5,5-trifluoro-2-oxo-1,3,2-dioxathiolane,
3-bromo-3,4,4-trifluoro-2,2-dioxo-1,2-oxathietane,
4-bromo-3,3,4-trifluoro-2,2-dioxo-1,2-oxathietane,
4-bromo-4,5,5-trifluoro-2-oxo-1,3,2-dioxathiolane,
3-chloro-3,4-difluoro-2,2-dioxo-1,2-oxathietane,
4-chloro-3,4-difluoro-2,2-dioxo-1,2-oxathietane,
4-chloro-4,5-difluoro-2-oxo-1,3,2-dioxathiolane,
3-chloro-4,4-difluoro-2,2-dioxo-1,2-oxathietane,
4-chloro-5,5-difluoro-2-oxo-1,3,2-dioxathiolane,
3-perfluorooctyl-3,4,4-trifluoro-2,2-dioxo-1,2-oxathietane,
4-perfluorooctyl-4,5,5-trifluoro-2-oxo-1,3,2-dioxathiolane,
3-perfluorodecyl-3,4,4-trifluoro-2,2-dioxo-1,2-oxathietane,
3-(ω-hydroperfluorodecyl)-3,4,4-trifluoro-2,2-dioxo-1,2-oxathietane,
3-n-decyl-3,4,4-trifluoro-2,2-dioxo-1,2-oxathietane
and the like.

The new cyclic sultones and sulfites of this invention are generically useful as insect repellents, particularly for use with wool or woolen-based fabrics. The sultone and sulfite need not be separated from their admixture. These compounds are particularly effective in combating fabric destruction and damage arising from the attack of the larvae of the black carpet beetle. Thus, when these new compounds are applied, either from solution in an inert diluent or (more conveniently the former) to samples of woolen fabric in amounts such as to give from 0.5 to 5.0% or higher of the compound based on the fabric, at which concentrations substantially no fabric damage or change in fabric properties occurs, damage from the black carpet beetle larvae is substantially completely prevented. More particularly, the sultone of 1,1,2,2-tetrafluoro-2-hydroxyethanesulfonic acid (i.e., 2,2-dioxo-3,3,4,4-tetrafluoro-1,2-oxathietane) was dissolved in methylene chloride at a concentration of 10% and swatches of single weight wool blanket fabric were immersed in said solution, thoroughly saturated therewith, removed, dried, washed briefly in cold water and dried again. The treated sample contained 0.67% fluorine by analysis (corresponding to about 1.5% by weight of the fabric of the tetrafluorosultone). The treated sample was then exposed to larvae of the black carpet beetle for twenty days, at the end of which time a count indicated 55% of the larvae to be dead, while the treated wool sample exhibited only a trace fabric damage. In contrast, a control (untreated) wool blanket fabric sample, exposed at the same time and under the same conditions for the same length of time, showed 11% fabric damage and no dead larvae.

The term "substituent" is used herein to denote that which has replaced hydrogen in the molecule, i.e., that which is substituted for hydrogen.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Polyfluoro-2,2-dioxo-1,2-oxathietanes of the formula

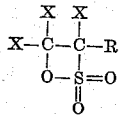

wherein X is a member selected from the group consisting of hydrogen and halogen atoms of atomic number no greater than 35, at least two of which atoms are fluorine, and R is a member selected from the group consisting of hydrogen, halogen atoms of atomic number no greater than 35, and alkyl and haloalkyl of up to ten carbon atoms, the halogen atoms in the haloalkyl being of atomic number no greater than 35, and at most one of X and R being hydrogen.

2. 3,3,4,4-tetrafluoro-2,2-dioxo-1,2-oxathietane.

3. Polyfluoro-2-oxo-1,3,2-dioxathiolanes of the formula

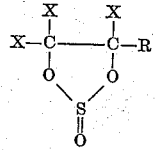

wherein X is a member selected from the group consisting of hydrogen and halogen atoms of atomic number no greater than 35, at least two of which are fluorine, and R is a member selected from the group consisting of hydrogen, halogen atoms of atomic number no greater than 35, and alkyl and haloalkyl of up to ten carbon atoms, the halogen atoms in the haloalkyl being of atomic number no greater than 35, and at most one of X and R being hydrogen.

4. 4,4,5,5-tetrafluoro-2-oxo-1,3,2-dioxathiolane.

5. A process for preparing polyfluoro-2-oxo-1,3,2-dioxathiolanes of the formula

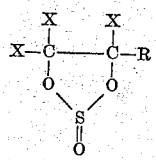

wherein X is a member selected from the group consisting of hydrogen and halogen atoms of atomic number no greater than 35, at least two of which are fluorine, and R is a member selected from the group consisting of hydrogen, halogen atoms of atomic number no greater than 35, and at most one of X and R being hydrogen, and alkyl and haloalkyl of up to ten carbon atoms, the halogen atoms in the haloalkyl being of atomic number no greater than 35, which consists in reacting hydrous sulfur trioxide with an olefin of the formula

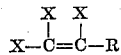

wherein X and R are as defined above.

References Cited in the file of this patent
UNITED STATES PATENTS 2,695,308    Gilbert  ---------------- Nov. 23, 1954
2,810,746    Rueggeberg et al. ------- Oct. 22, 1957

FOREIGN PATENTS 284,070    Switzerland ------------- Nov. 1, 1952

UNITED STATES PATENT OFFICE
CERTIFICATE OF CORRECTION

Patent No. 3,163,656                      December 29, 1964

John Lynde Anderson et al.

It is hereby certified that error appears in the above numbered patent requiring correction and that the said Letters Patent should read as corrected below.

Column 3, line 66, for "dstilled" read -- distilled --; column 5, line 51, for "53.8" read -- 53.2 --; line 73, for "dichloro-2,4-difluoro-" read -- dichloro-3,4-difluoro- --; column 7, line 35, for "troxide" read -- trioxide --; line 56, for "absorbed" read -- adsorbed --; column 8, line 28, for "themperature" read -- temperature --.

Signed and sealed this 4th day of May 1965.

(SEAL)
Attest:

ERNEST W. SWIDER
Attesting Officer

EDWARD J. BRENNER
Commissioner of Patents